United States Patent
Pekelny et al.

(10) Patent No.: US 11,074,749 B2
(45) Date of Patent: Jul. 27, 2021

(54) PLANAR SURFACE DETECTION

(71) Applicant: Microsoft Technology Licensing, LLC, Redmond, WA (US)

(72) Inventors: Yuri Pekelny, Seattle, WA (US); Ali O. Ulusoy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/396,444

(22) Filed: Apr. 26, 2019

(65) Prior Publication Data
US 2020/0342664 A1 Oct. 29, 2020

(51) Int. Cl.
*G06T 17/20* (2006.01)
*G06T 11/40* (2006.01)
*G06T 19/00* (2011.01)

(52) U.S. Cl.
CPC .............. *G06T 17/20* (2013.01); *G06T 11/40* (2013.01); *G06T 19/006* (2013.01)

(58) Field of Classification Search
CPC ...................................................... G06T 17/20
USPC ......................................................... 345/419
See application file for complete search history.

(56) References Cited

U.S. PATENT DOCUMENTS

| 7,333,107 | B2 | 2/2008 | Papageorgiou |
| 9,412,040 | B2 | 8/2016 | Feng et al. |
| 2007/0052706 | A1 | 3/2007 | Martin |
| 2014/0198965 | A1 | 7/2014 | Woods et al. |
| 2015/0062120 | A1* | 3/2015 | Reisner-Kollmann ....... G06T 19/006 345/419 |
| 2015/0154467 | A1* | 6/2015 | Feng ........................ G06T 7/12 382/203 |
| 2017/0039731 | A1* | 2/2017 | Liu .......................... G06T 7/60 |
| 2017/0148211 | A1* | 5/2017 | Zakhor .................. G06T 15/005 |

OTHER PUBLICATIONS

Cupec, Robert, "Detection of Local Reference Frames and Geometric Primitives Based on Planar Patches", In Technical Report ARP3D.IR4.11-B, 2018, 13 Pages.

Energin, et al., "Re-Creation of Virtual Environment Through a Video Call", Application as Filed in U.S. Appl. No. 15/994,585, filed May 31, 2018, 62 Pages.

Fischer, et al., "Extracting Buildings from Aerial Images using Hierarchical Aggregation in 2D and 3D", In Journal of Computer Vision and Image Understanding, vol. 72, Issue 2, Nov. 1998, 30 Pages.

Fischler, et al., "Random Sample Consensus: A Paradigm for Model Fitting with Applications to Image Analysis and Automated Cartography", In Journal of Communications of the ACM Magazine, vol. 24, Issue 6, Jun. 1981, pp. 381-395.

(Continued)

*Primary Examiner* — Shivang I Patel
(74) *Attorney, Agent, or Firm* — Rainier Patents, P.S.

(57) ABSTRACT

The described implementations relate to processing of an environment using a plurality of sub-volumes, and specifically to generating surface representations in the plurality of sub-volumes for individual processing. One example can identify planar fragments within the plurality of sub-volumes. The example can determine that various planar fragments constitute part of a contiguous planar surface and should be aggregated. The example can also output data representing the contiguous planar surface formed from the aggregated planar fragments.

21 Claims, 10 Drawing Sheets

(56) References Cited

OTHER PUBLICATIONS

Gerstweiler, et al., "Extraction of Structural and Semantic Data from 2D Floor Plans for Interactive and Immersive VR Real Estate Exploration", In journal of Technologies, vol. 6, Issue 4, Nov. 4, 2018, 27 Pages.

Kazhdan, et al., "Poisson Surface Reconstruction", In Proceedings of the Fourth Eurographics Symposium on Geometry Processing, Jun. 26, 2006, 10 Pages.

Klein, et al., "Parallel Tracking and Mapping for Small AR Workspaces", In Proceedings of 6th IEEE and ACM International Symposium on Mixed and Augmented Reality, Nov. 13, 2007, 10 Pages.

Liu, et al., "PlaneRCNN: 3D Plane Detection and Reconstruction from a Single Image", in Journal of Computing Research Repository, Dec. 10, 2018, 16 Pages.

Lorenson, et al., "Marching Cubes: A High Resolution 3D Surface Construction Algorithm", In Proceedings of the 14th Annual Conference on Computer Graphics and Interactive Techniques, Jul. 1987, pp. 163-169.

Newcombe, et al., "KinectFusion: Real-time Dense Surface Mapping and Tracking", In Proceedings of 10th IEEE International Symposium on Mixed and Augmented Reality, Oct. 26, 2011, pp. 127-136.

Lu, et al., "Volume Decomposition and Feature Recognition Hexahedral Mesh Generation", In Proceedings of 8th International Meshing Round Table, Sep. 27, 1999, 14 Pages.

Turner, et al., "Floor Plan Generation and Room Labeling of Indoor Environments from Laser Range Data", In Proceedings of International Conference on Computer Graphics Theory and Applications, Jan. 5, 2014, 12 Pages.

Xiong, et al., "Using Context to Create Semantic 3D Models of Indoor Environments", In Proceedings of British Machine Vision Conference, Sep. 2010, 11 Pages.

"International Search Report and Written Opinion Issued in PCT Patent Application No. PCT/US20/022880", dated Jun. 4, 2020, 12 Pages.

\* cited by examiner

ENVIRONMENT 100

PLANAR SURFACE DETECTION

BACKGROUND

Surface information relating to physical environments is useful in multiple scenarios, such as augmented reality, gaming, architectural planning, and other industrial settings. The capability to determine planar surface information from these surface representations is useful for allowing a user to interact with the physical environment, while also enabling the presentation of appropriate mixed reality data to the user. However, in large-scale physical environments, existing methods of processing such planar surface information have proven unsatisfactory.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Figure 1A:
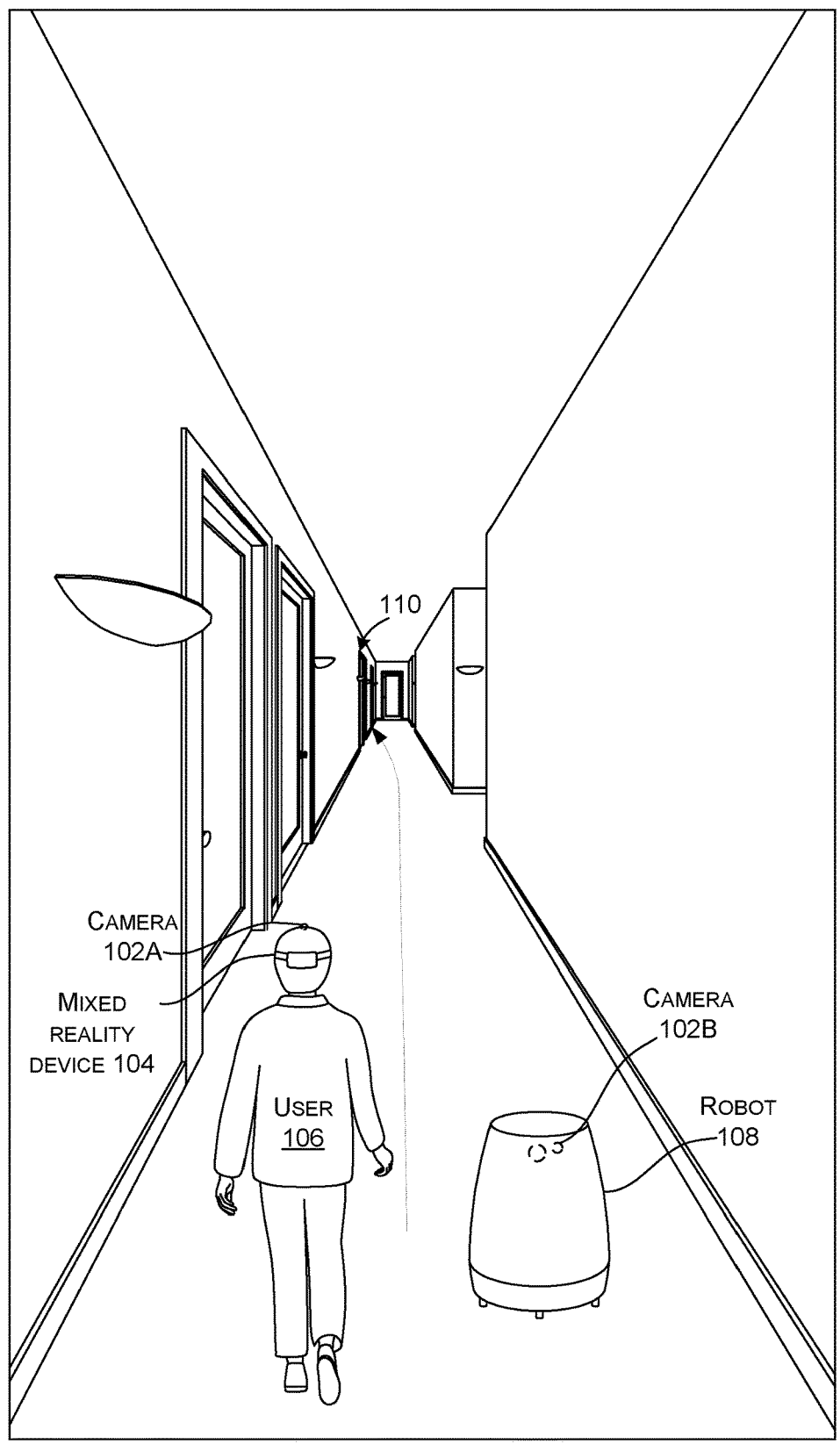
FIGS. 1A-1H depict example image scenarios in accordance with some implementations of the present concepts.

This discussion relates to the use of cameras to provide environment information relating to a physical environment, such as a facility, and further relates to efficient ways to process environment information to detect planar surfaces without overburdening available computing resources that may be available to a computing device intended to process the environment information. The environment information can be used for various purposes, such as to recreate the environment in a virtual manner for training purposes, or by providing enhancements to the environment through augmented reality. Moreover, enhanced visualization data can be provided to create a mixed reality environment where a user can interact or co-exist with virtual, computer-generated mixed reality content.

Such mixed reality content can include graphics that are representative of objects, people, biometric data, effects, etc., that are not physically present in the environment. Mixed reality content can include two-dimensional graphics, three dimensional objects, and/or content associated with applications. For example, a mixed reality environment can augment a physical, real-world scene (e.g., an office) and/or a physical, real-world person with mixed reality content, such as computer-generated graphics (e.g., a cat, a chair, an advertisement on a wall, etc.) in the physical, real-world scene.

However, the scale of the environment information can be problematic for small mixed reality devices, such as those powered by batteries. For example, a user wearing a mixed reality device may receive a surface representation generated from environment information that corresponds to an entire building or factory. However, to place any mixed reality elements, traditionally the mixed reality device must process the surface representation corresponding to the entire building or factory in order to determine appropriate planar surfaces within the surface representation.

Due to the scale of the surface representation created from the environment information, this may prove too computationally intensive for the mixed reality device. For instance, the battery resources may be used unacceptably fast. Alternatively, the intense computation may cause delays that make an augmented reality experience less believable. For instance, if the user rolls a virtual ball in the environment, the ball may stop or glitch until the surface representation computations are completed. Moreover, as computational processing moves to shared resources on the Internet, the amount of data needing to be sent over a wireless transmission from the mixed reality device may need to be reduced for efficient operation. Thus, the following description solves the technical problem of performing environment information processing in manageable sized sub-volumes of the environment, and seamlessly stitching together certain environmental aspects that were separated into sub-volumes to ensure an accurate representation of the environment. These and other aspects are described below.

FIGS. 1A-1H collectively relate to an example environment 100, which may represent, for example, an office building or other such facility, but in some instances may include outdoor environments. With reference to FIG. 1A, a camera 102 may be used to capture environment information 112 (depicted in FIG. 1B) of portions of the environment 100 and/or of scenes generally. (Note that for ease of explanation in introductory FIGS. 1A-1H, the term "environment information" is used broadly and can include two-dimensional images, three-dimensional images, visible light images and/or non-visible light images, among others).

In this example, camera 102A (facing away from reader) is manifest as an element of a head mounted mixed reality device 104 worn by a user 106. Camera 102B is manifest as one of the sensors on a semi-autonomous facilities robot 108. Other camera manifestations are contemplated and additional examples are described relative to FIG. 4. Note that the location and orientation of the camera 102 can be tracked. For instance, the earth coordinate system location of the camera can be known. For example, the location of the camera can be tracked via global navigation satellite system coordinates, such as global positioning system (GPS) coordinates (e.g., the camera is at a particular xyz location). Further, the orientation of the camera can be tracked. For example, micro-electro-mechanical sensors (MEMS) can track the orientation relative to six axes (e.g. the camera is facing in a specific horizontal direction and at a specific vertical direction).

Figure 1B:
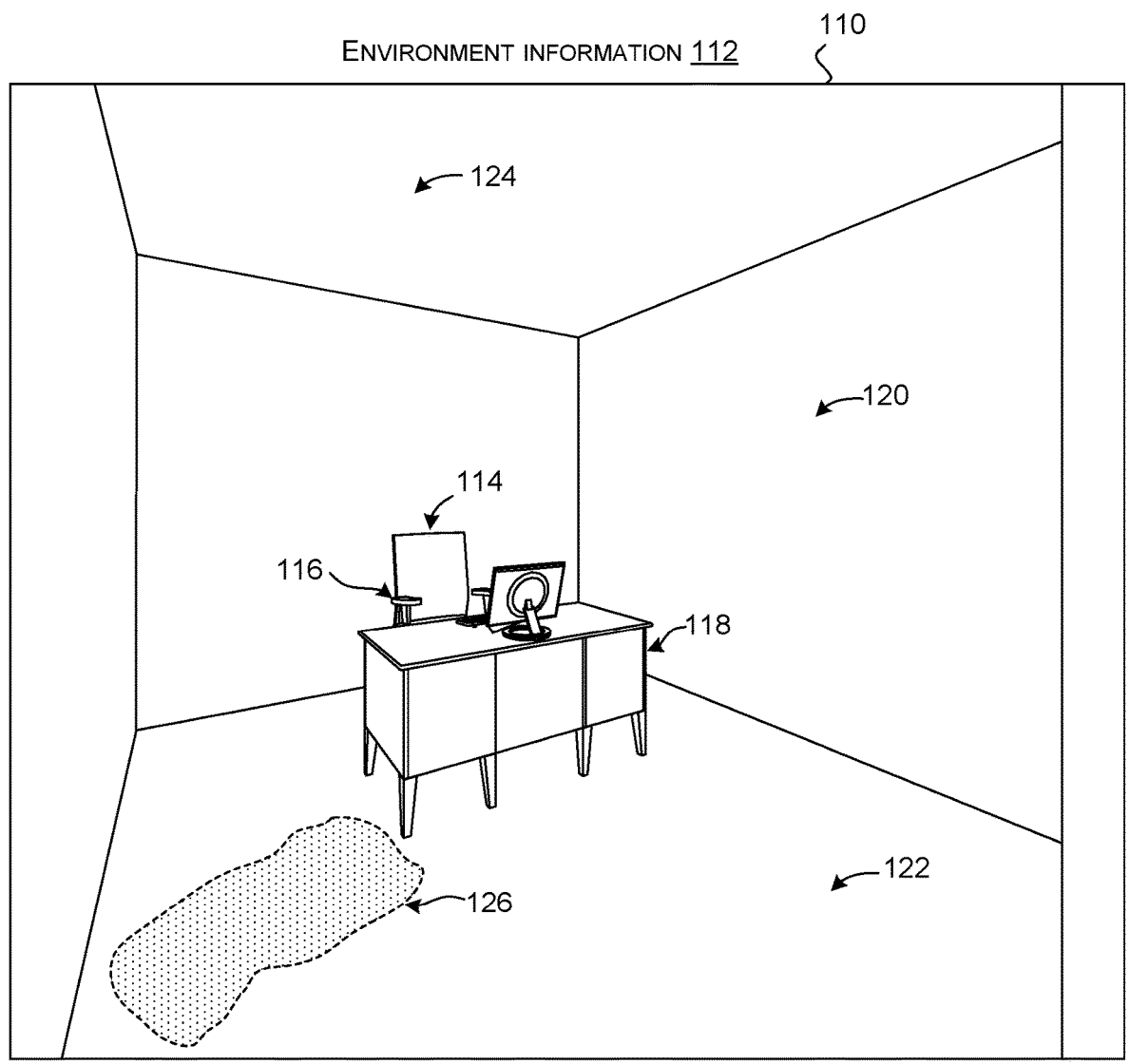

As depicted in FIG. 1A, user 106 may be walking a path to arrive at office 110, which is depicted in FIG. 1B. The cameras 102 can capture environment information, such as multiple images of environment 100 from multiple different viewpoints, and the images can be fused together to create surface representations of portions of the environment 100 and/or of scenes generally as the user progresses toward office 110. The environment information can include depth information received from depth images (e.g., how far regions of the image are from the camera), which can be aligned to a three-dimensional earth coordinate system given that the location and orientation of the camera is known, and may be represented as, for example, point clouds or surface meshes. It is to be appreciated that there are techniques for generating depth information from non-depth images, such as two-dimensional images. For instance, depth information can be generated from pairs of two-dimensional images. Thus, depth information can be available without traditional depth images.

Referring to FIG. 1B, environment information 112 of office 110 is depicted as a portion of environment 100. Environment information 112, as generated by cameras 102, may include information related to various physical objects located within office 110, such as a chair 114 having chair arms 116, desk 118, walls 120, floor 122, and ceiling 124. These various physical objects can have planar regions associated with them, such as planar region 126 corresponding to a section of the plane defined by floor 122.

Furthermore, the owner of environment 100 or office 110 may desire that whenever user 106 wearing mixed reality device 104 enters a particular room in the environment, such as office 110, a holographic representation of an object can be placed on one of the planar regions, such as planar region 126. To accurately place a hologram on planar region 126, mixed reality device 104 must correctly determine the position of planar region 126, in relation to other planar regions within office 110.

However, as noted earlier, to accurately identify the planar regions, a device may require processing the entire surface representation generated from environment information corresponding to environment 100. As this can introduce difficulties on low power mixed reality devices, or on network/cloud-based processing, embodiments of the invention disclosed herein may allow environment 100 to instead be partitioned into a virtual grid of sub-volumes according to the three-dimensional coordinate space. Then, environment information corresponding to environment 100 can be used to generate a surface representation in each of the sub-volumes, and the smaller surface representations can then be processed individually for determining planar regions, in order to reduce power requirements.

Figure 1C:
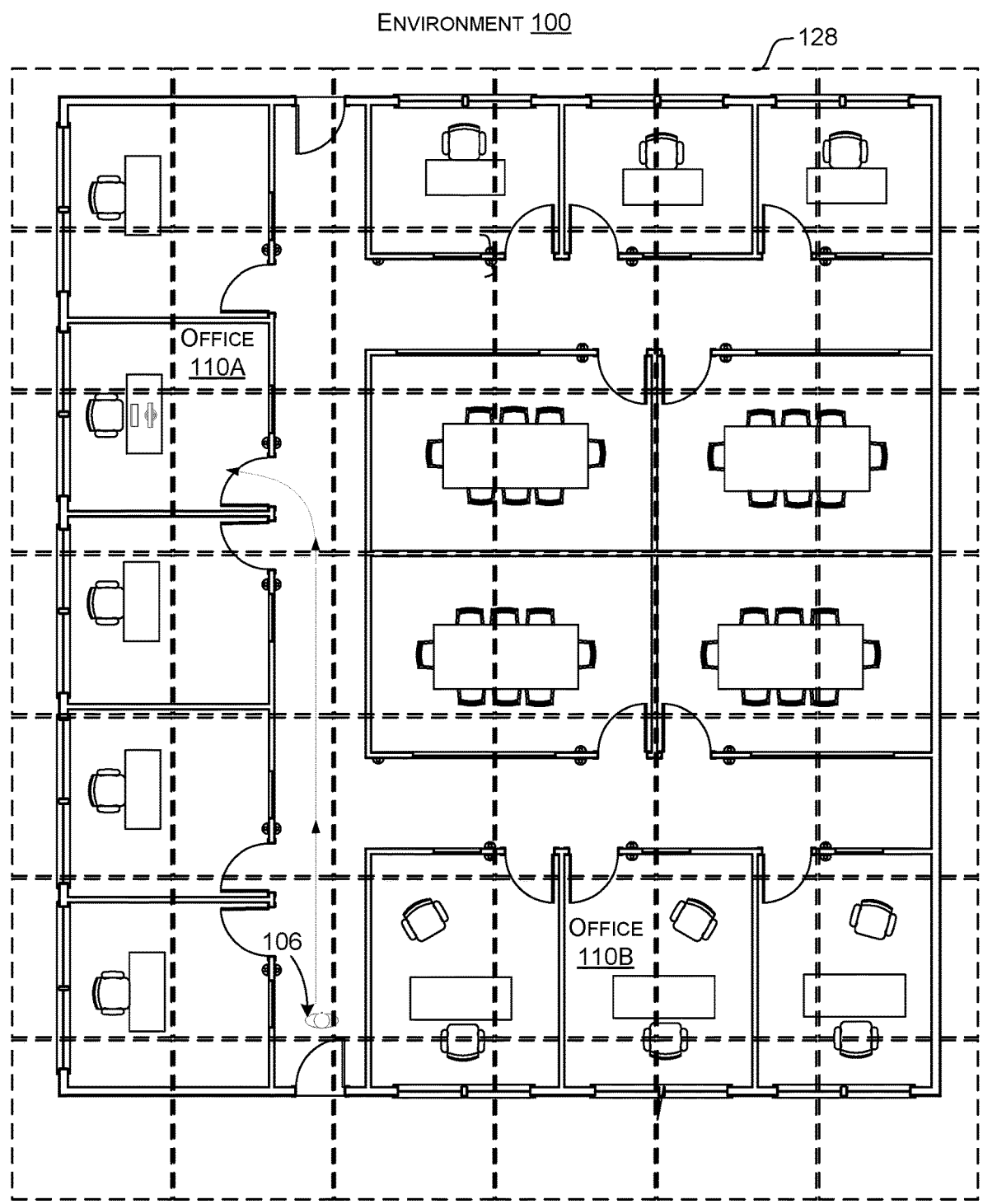

FIG. 1C depicts an example overhead view corresponding to environment 100 of FIG. 1A, which shows user 106 progressing toward office 110. As described above, environment 100 can be divided into a plurality of sub-volumes 128, and a surface representation corresponding to environment information 112 can be generated in each of the plurality of sub-volumes. By creating the surface representation in sub-volumes 128, processing requirements with respect to planar surface detection can be reduced, as a plane detection process can be performed with respect to only certain sub-volumes of interest. Specifically, each sub-volume can be processed individually to determine planar regions within each sub-volume. However, in certain instances, the plane detection process can be executed on all sub-volumes in parallel depending on the capabilities of, for example, mixed reality device 104.

For example, when user 106 enters office 110A, plane detection can be performed on the specific sub-volumes that encompass the area of office 110A, resulting in a reduced amount of processing for mixed reality device 104. Specifically, mixed reality device 104 does not need to detect planar regions of office 110B, in order for mixed reality device 104 to appropriately a hologram on floor 122 of office 110A. Note that for purposes of explanation, the sub-volumes 128 are shown to be of a representative size and shape, but can be of any specific size and shape, and therefore environment 100 may be partitioned into many more sub-volumes than what is depicted. The individual sub-volume size can, for example, be defined depending on the processing and/or wireless capabilities of mixed reality device 104.

Figure 1D:
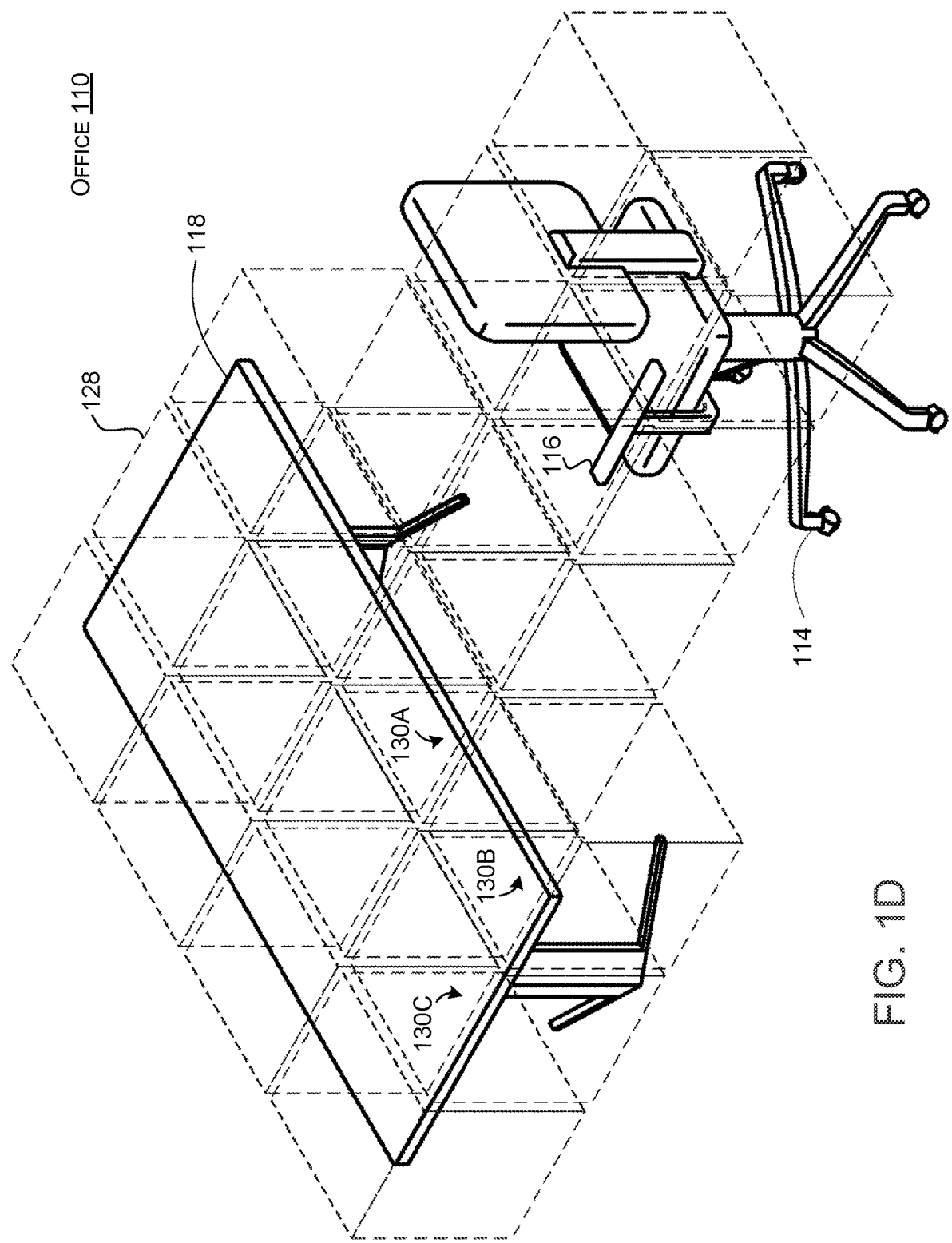

FIG. 1D depicts an area specific to office 110, where a three-dimensional environment corresponding to office 110 has been partitioned into a plurality of sub-volumes 128, depicted as cubical volumes having equal size. While FIG. 1D is shown with spacing between sub-volumes 128 (for ease of understanding of the drawings), it is to be appreciated that sub-volumes 128 may be created such that each sub-volume is slightly overlapping to ensure that the entire surface volume of the environment 100 is captured. Moreover, in certain configurations, the sub-volumes may each be of a fixed size and cubical in shape as depicted in FIG. 1D, but different sizes or shapes are equally usable depending on user preferences. Once the sub-volumes 128 are created, a surface representation corresponding to environment information can be generated in the plurality of sub-volumes 128.

As shown in FIG. 1D, the surface of desk 118 may span several of the sub-volumes 128. When a plane detection process is performed (as described in further detail below relative to FIG. 2) on individual sub-volumes, the plane detection process can identify planar regions that may constitute planar fragments of a contiguous planar surface. For example, the surface of desk 118, as depicted in FIG. 1D, spans several sub-volumes. Therefore, when the plane detection process is performed, a planar surface (e.g., surface of desk 118) that spans multiple sub-volumes can become fragmented, resulting in desk planar fragments 130A, 130B, and 130C. Similarly, certain surfaces of chair 114 and chair arm 116 may span several of the sub-volumes 128.

Figure 1E:
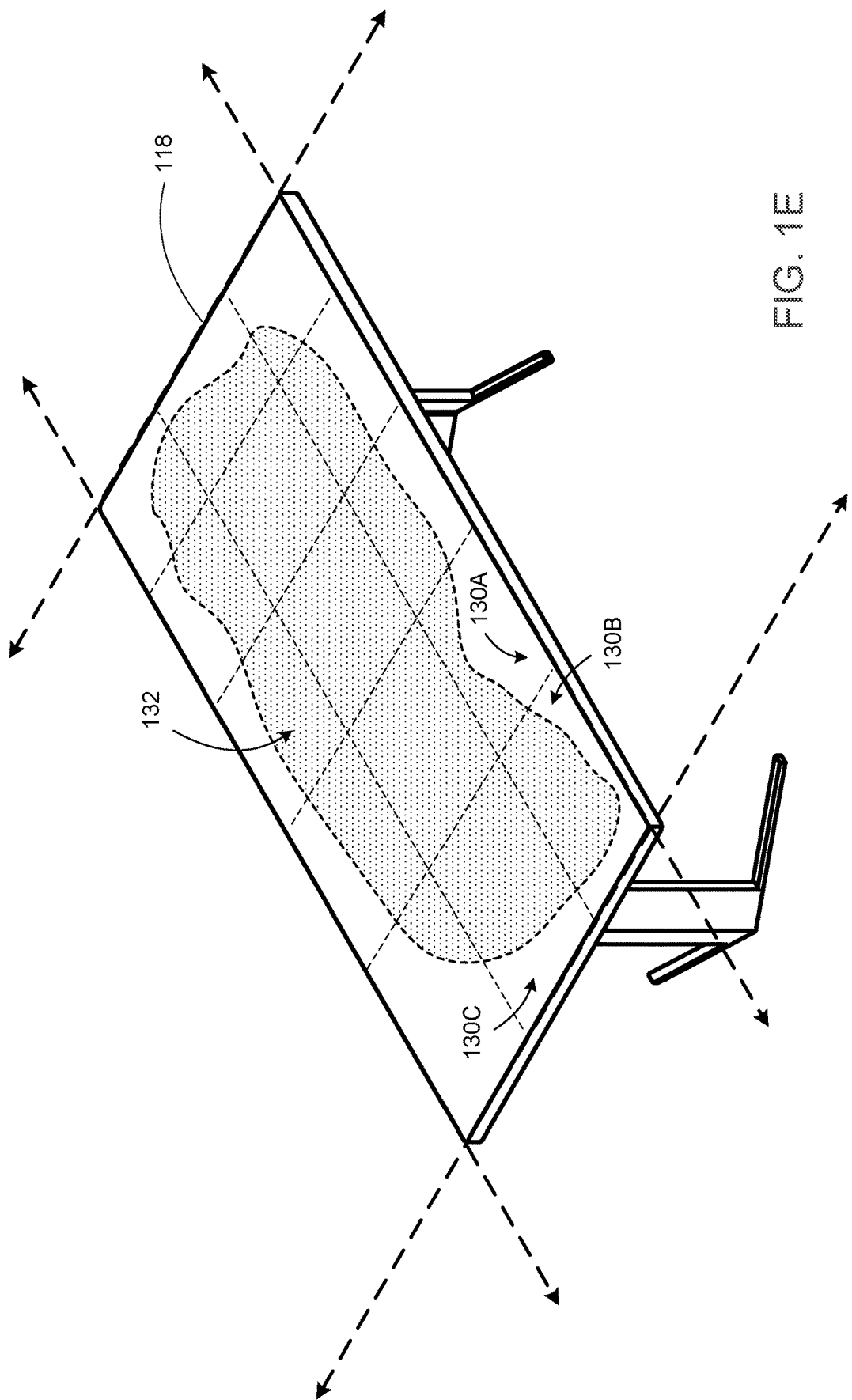

This aspect is depicted in FIG. 1E, where the surface of desk 118 has desk planar fragments 130A, 130B, and 130C as a result of the partitioning into sub-volumes. However, desk planar fragments 130A, 130B, and 130C constitute portions of a contiguous planar surface 132 (shown for ease of illustration as a freeform area) associated with the surface of desk 118.

As desk planar fragments 130A, 130B, and 130C constitute contiguous planer surface 132 associated with the surface of desk 118, additional processing can be performed to aggregate any plane fragments that may constitute a contiguous planar surface. Therefore, while segmenting planar detection into sub-volumes assists in reducing processing requirements, a plane aggregation process (as described in further detail below relative to FIG. 3) can be performed to determine whether a planar region has been split into planar fragments dispersed across sub-volumes.

Generally, when processing a particular sub-volume having a planar fragment, the plane aggregation algorithm can check neighboring sub-volumes based on the relative positions of the sub-volumes, and determine planar fragments having similar plane equations to the current planar fragment. When certain planar fragments are determined to have a similar plane equation, they can be marked as candidate planar fragments for aggregation into a contiguous planar surface. In some instances, the similarity of planar fragments can be based on a comparison of a plane equation associated with a seed plane and each planar fragment, as described in greater detail below with regard to FIG. 3.

For example, with reference to FIG. 1D, the plane aggregation process may determine that desk planar fragments 130A, 130B, and 130C are all similar in plane equation, and will mark the planar fragments as candidates for aggregation. However, the plane aggregation process may also determine that planar fragments associated with the top of chair arm 116 have a similar plane equation to, for example, desk planar fragment 130A (due to the chair height being set such that the chair arms are level with the desk), and as a result, may assume that the planar fragments associated with the top of the chair arm constitute candidate planar fragments that should be aggregated with desk planar fragment 130A to form a contiguous planar surface.

However, as this would be an incorrect joining of planar fragments (i.e., a chair arm should not be considered a common plane with a desk), the plane aggregation algorithm can perform a connected components analysis to detect planar fragments across sub-volumes that may have similar planar equations, but do not fall within a set threshold to the other planar fragment. In certain instances, the threshold can be based on a variety of different parameters, but in this example the threshold may be based on a distance between planar fragments.

When it is determined that a planar fragment is not within the threshold distance of another planar fragment, this plane can be removed from the listing of candidate planar fragments that will be aggregated together to form the contiguous planar surface. This threshold distance can be set by a user, depending on the sensitivity desired out of the plane aggregation process. For example, a user may define the threshold distance to be one meter if the process should be overly inclusive, or may set a threshold distance to one centimeter or even one millimeter for more exact definitions of planar surfaces. It is to be appreciated that any set distance can be used.

Figure 1F:
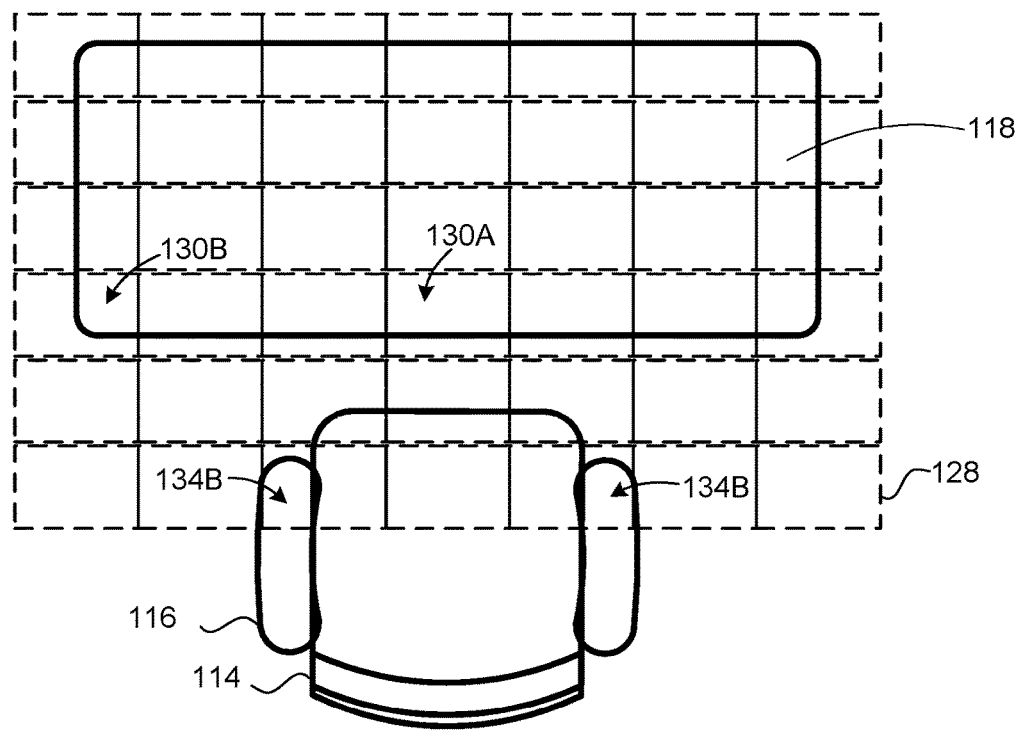

FIG. 1F depicts a top-down view showing a plurality of sub-volumes 128, where a planar surface corresponding to desk 118 is divided into desk planar fragments 130A and 130B, and planar surfaces corresponding to chair arm 116 is divided into chair arm planar fragments 134A and 134B. As noted earlier, in some instances a planar fragment, such as chair arm planar fragment 134A, may have a similar plane equation to a planar fragment associated with a different object, such as desk planar fragment 130A, but these planar fragments should not be aggregated due to belonging to different objects.

As such, the connected components analysis can check whether the planar fragments are within the threshold distance from each other. This can be performed by creating a two-dimensional projection image based at least on the three-dimensional surface points in one planar fragment and the three-dimensional surface points associated with candidate planar fragments that are marked for possible aggregation. Based on the projection image, pixels representing the surface points can be compared to determine whether they fall within the threshold.

Figure 1G:
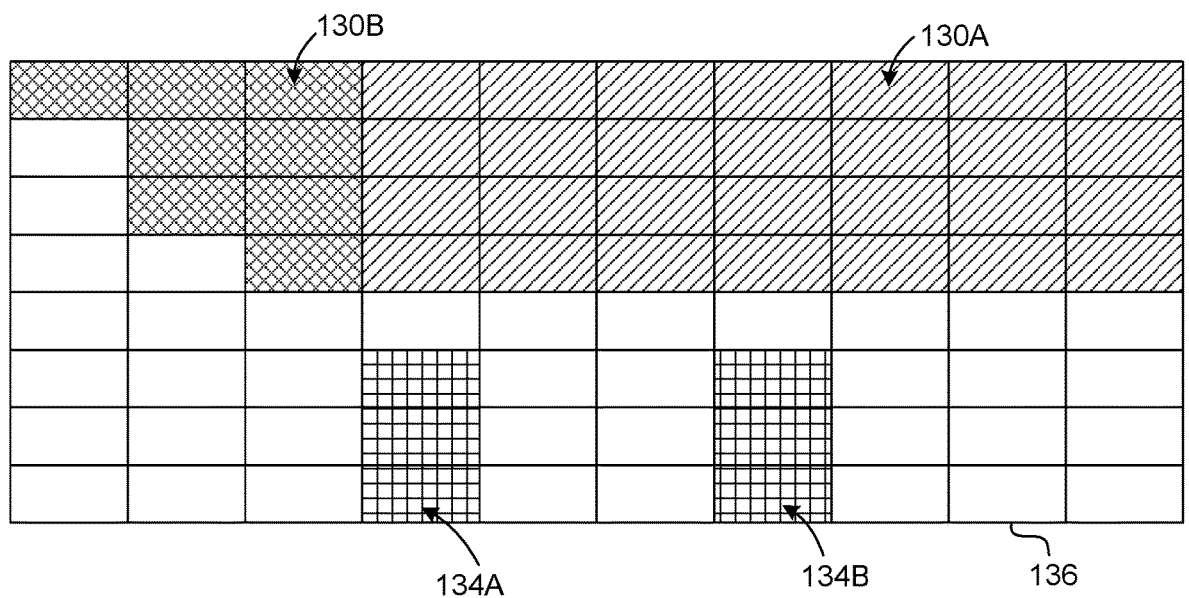
Figure 1H:
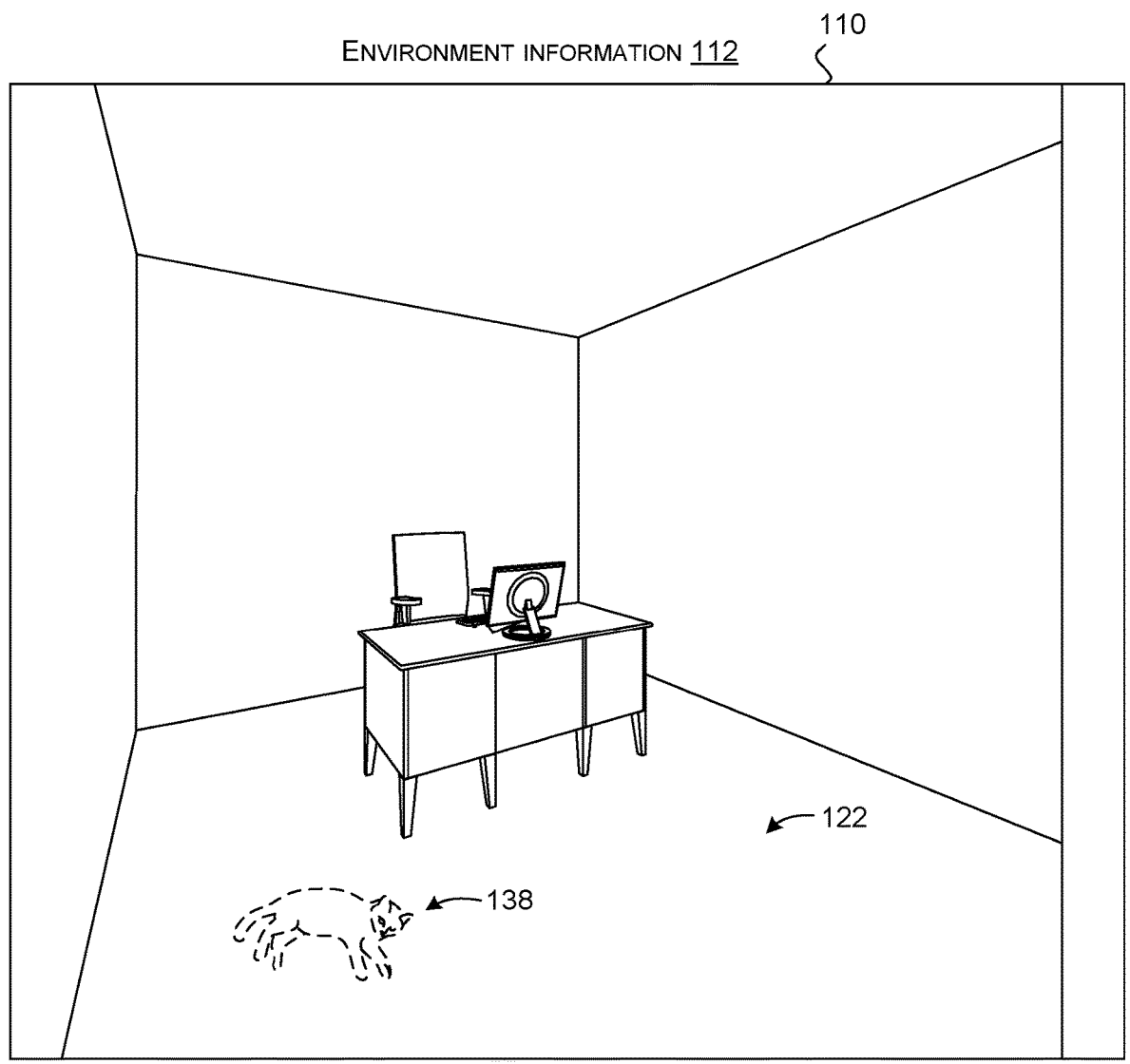

As depicted in FIG. 1G, a projection image 136 is shown as a large grid for illustration purposes, but in actual implementation, the projection image can be created by rasterizing the surface points into pixels. The projection image can be generated such that the distance between pixels of a planar surface equate to the threshold distance defined by the user. As such, if there exists a section of the projection image where there is a perceivable gap (i.e., using projection image 136 as an example, any empty grid cells between two pixels associated with planar fragments), the connected components analysis process can determine that at least a threshold distance exists between the planar fragments. In creating the projection image, each candidate planar fragment can be associated with a different marker, such as a semantic label, color, or other such identifying indicia.

For example, as depicted in FIG. 1G, which represents the two-dimensional projection image corresponding to FIG. 1F, a number of pixel regions associated with different candidate planar fragments can be shown. For illustration purposes, desk planar fragment 130A is shown with diagonal hatching, while desk planar fragment 130B is shown with cross hatching, and chair arm planar fragments 134A and 134B are shown with square hatching.

As an example, if the threshold distance is set to one centimeter, then each pixel (or cell, as depicted for ease of illustration in FIG. 1F) of projection image 136 can be spaced apart according to this threshold distance. Using this spacing, the connected components analysis can parse the projection image and determine that desk planar fragment 130A directly connects with desk planar fragment 130B within the defined threshold amount, as there is no perceived gap in the projection image (i.e., no empty pixel). Therefore, the connected components analysis can determine that desk planar fragments 130A and 130B not only include similar plane equations, but that they are within the threshold distance for aggregation, so will be joined together in the final contiguous planar surface.

In contrast, the connected components analysis can determine that there are gaps (i.e., an empty pixel and therefore at least one centimeter of space) between desk planar fragment 130A, and both chair arm planar fragments 134A and 134B. As such, while the chair arm planar fragments 134A and 134B may have a similar plane equation to desk planar fragments 130A and 130B, because the projection image indicates a gap between the projected points, the connected components analysis can determine that the planar fragments are not within the threshold distance, and should not be included in the final contiguous planar surface that is aggregated together.

In certain instances, semantic labels associated with planar fragments can be checked as part of the connected components analysis. That is, upon determining that chair arm fragments 134A and 134B should not be included in the final contiguous planar surface, a secondary check can be performed based on any semantic labelling associated with the planar fragments. In this instance, the semantic labels associated with chair arm planar fragments 134A and 134B may be labelled as "chair," while the semantic labels associated with desk planar fragments 130A and 130B may be labelled as "desk," therefore confirming that the analysis properly excluded chair arm planar fragments 134A and 134B from the final contiguous planar surface. However, in other instances, if the semantic labels for fragments set for removal also reflect "desk," a user may realize that the threshold distance being used by the connected components analysis may be set at too close a distance.

Once the final contiguous planar surface is determined, data can then be output enabling usage of the contiguous planar surface. This resulting data can be utilized in a number of ways for displaying content to a user. In one instance, the process can send a collection of all surface points associated with the contiguous planar surface to the mixed reality device 104 so that the device can accurately process holographic information in an environment. For example, with reference to FIG. 1H, once the contiguous planar surface corresponding to floor 122 is determined, a cat hologram 138 can be placed on the contiguous planar surface. Alternatively, a bounding box could be provided to the mixed reality device 104, or to an external server or device that can perform additional processing on the various contiguous planar surfaces.

In addition to the aspects discussed above, the environment information of environment 100 may change over time. For example, while a chair may be present in a hallway of the environment on one day, the chair may be moved to a different section of the environment the next day. It can be impractical to constantly require mixed reality device 104 to process every sub-volume in environment 100 in an attempt to determine whether there have been any temporal changes in the sub-volumes. As such, mixed reality device 104 can load stored planar data from memory (e.g., internal memory or a database stored on, for example, a hard disk or other computer-readable storage medium) that correspond to specific sub-volumes surrounding the user 106 wearing mixed reality device 104, such as a spherical area surrounding mixed reality device 104.

For example, a sphere having a fixed distance can be used, where any sub-volumes that fall within the spherical distance from the user 106 can be loaded from memory, and prior environment information associated with those sub-volumes can be compared to current or subsequent environment information associated with those sub-volumes. When changes in the environment information are detected, mixed reality device 104 may determine whether the amount of changes between the prior environment information and the subsequent environment information exceed a threshold number of changes. It is to be appreciated that any shape other than a sphere can be used, or mixed reality device 104 may be programmed to only load N number of sub-volumes at a time, such as one sub-volume in each cardinal direction based on the current position of user 106.

Such a threshold number of changes can be user defined and dependent on the needs of the exactness of planar regions associated with environment 100. If it is determined that the changes exceed the threshold, mixed reality device 104 can re-process the planar region data associated with any sub-volume that exhibits changes that exceed the threshold number of changes or deviations. For example, while a prior environment information may show a desk being three feet from wall 120, the current environment information may depict the desk being four feet from wall 120. Based on the threshold value, this may be within the tolerance bounds of acceptable changes, and mixed reality device 104 can avoid having to re-process the planar data associated with the desk.

Figure 2:
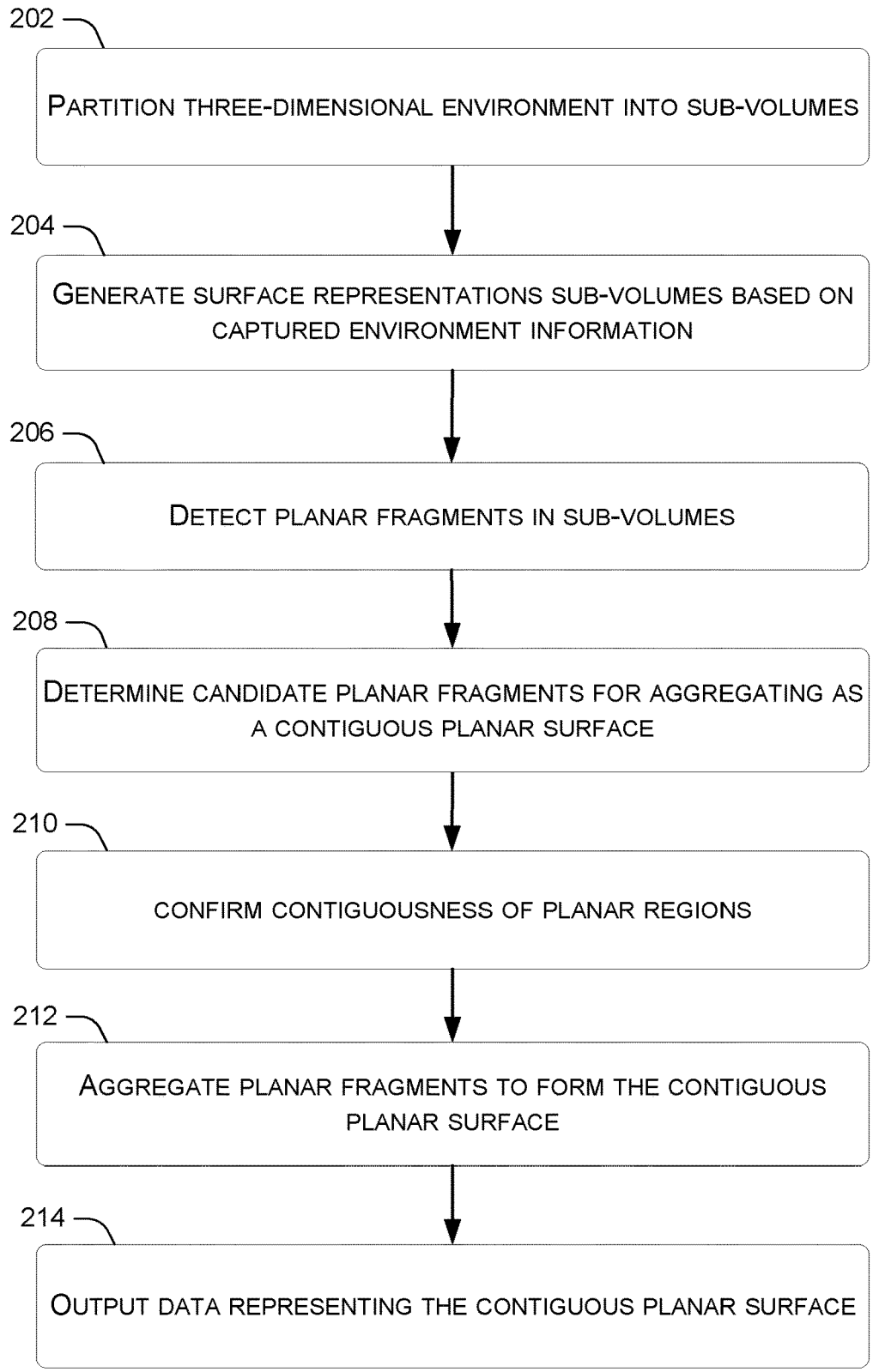
FIGS. 2 and 3 depict example flowcharts for accomplishing environmental processing concepts in accordance with some implementations.

FIG. 2 offers a detailed overview of a method 200 for performing the sub-volume processing described earlier. Initially, at block 202, a three-dimensional environment representing environment 100 can be partitioned into a plurality of sub-volumes. For example, in partitioning the three-dimensional environment into sub-volumes, a bounding box of a fixed size and/or volume can be set with respect to coordinates of the three-dimensional environment. Once the bounding box is set, sections of the three-dimensional environment that fall within the bounding box can be partitioned off as sub-volumes.

In certain instances, minimum amounts of surfaces may be defined, where a partitioned sub-volume may be required to have at least a threshold number of surfaces to be included in sub-volumes resulting from the partitioning. For example, a user may not be interested in any floor surfaces for purposes of determining planar surfaces, and during partitioning, specific sub-volumes can be checked to determine a sub-volume solely has floor surfaces. In this instance, the sub-volume containing only floor surfaces could be excluded from any additional processing.

At block 204, environment information, such as depth measurements received from cameras 102, can be used to generate a surface representation in each individual sub-volume. Specifically, by using the environment information received from cameras 102, a surface representation corresponding to the bounding box of each sub-volume can be generated in the sub-volumes.

Alternatively, in certain instances, blocks 202 and 204 could be collapsed into a single step, whereby user 106 wearing mixed reality device 104 can move about environment 100, and during this movement, bounding boxes of a fixed size and/or volume can be defined that surround user 106. The bounding boxes can be defined based on the current location of user 106, and surface representations corresponding to the bounding boxes can be generated based on data received from, for example, camera 102A.

Furthermore, as user 106 moves about environment 100, additional sub-volumes can be created dynamically surrounding user 106. Additionally, as user 106 moves about environment 100, certain bounding boxes created around user 106 may correspond to sections of environment 100 that lack surfaces entirely. In this case, additional processing with respect to that bounding box can be cancelled because there are no planar regions to detect.

Once the surface representations are generated, at block 206, planar fragments in the sub-volumes can be detected. Specifically, a sub-volume plane detection algorithm can detect planar regions in each sub-volume's surface representation, where each planar region can be identified by surface points that lie on the plane, and an associated three-dimensional plane equation, and certain planar regions can be marked as potential planar fragments that are part of a contiguous planar surface.

The sub-volume plane detection algorithm used at block 206 first can determine the existence of planar regions within each sub-volume. Specifically, a k-Nearest Neighbors algorithm can be performed in order to compute the k nearest surface points for each of the surface points in the sub-volume, where k represents a predefined constant specifying the number of neighbors to access. These k-nearest neighbors may be based on, for example, mesh triangle connectivity information, or by using a k-d tree data structure. Next, a surface normal can be computed for each three-dimensional surface point within the sub-volume by fitting a plane to that surface point's k-nearest neighbors, and each of the three-dimensional surface points are then sorted according to how well the fitted plane of the surface point matches with the point's k-nearest neighbors. It is to be appreciated that k can be defined as any number, and while a small value of k can result in faster processing due to having to check only a limited number of neighbors, a large value of k can potentially capture a greater number of similar surface points, thereby improving the detection of planar regions.

Based on the sorting of the three-dimensional surface points, the point that is most planar (i.e., has the best plane fit to the point's k-nearest neighbors) can be selected as a seed point. The sub-volume plane detection algorithm can then initiate a breadth-first traversal (BFT), where the k-nearest neighbors of any inliers of the seed point are checked to discover any additional surface points that should be considered inliers to the seed point. In this instance, a surface point can be considered an inlier to the seed point plane if it is within a certain distance to the seed point plane, and its surface normal is within a certain angle to the seed point plane's surface normal.

Once the BFT terminates (i.e., no additional inliers could be added), a refined plane can be fit to the seed point and the entire set of inlier points. Next, the sub-volume plane detection algorithm can initiate another BFT on the refined plane to attempt to determine whether any additional inlier points can be added to the refined plane, and this process may be repeated until no additional inlier points can be added to a particular seed point plane. This entire process can be performed on each surface point in a sub-volume, and through iterative processing, the various planar surfaces in the sub-volume can be discovered.

However, as noted earlier, because a planar surface can span multiple sub-volumes, at block 208, a plane aggregation algorithm can be performed to determine candidate planar fragments for aggregating as a contiguous planar surface. An example plane aggregation algorithm is described in more detail below relative to FIG. 3. As a result of the plane aggregation algorithm, candidate planar fragments can be marked for possible aggregation.

Next, at block 210, a connected components analysis can be performed to confirm the contiguousness of the candidate planar fragments. Specifically, the connected components analysis can utilize a two-dimensional projection image that can be created by rasterizing the three-dimensional surface points of candidate planar fragments. The two-dimensional projection can be used by the connected components analysis to detect contiguousness of the planar regions that are candidates for aggregating. As described earlier, while two surfaces may have similar planar equations, and therefore be candidates for aggregating, they may in fact be separated by at least a threshold distance, and by using the two-dimensional projection image in the manner set forth above with respect to FIG. 1F, this threshold distance can be checked between points of candidate planar fragments.

At block 212, the candidate planar fragments that have been found to be contiguous as a result of the connected components analysis can be aggregated to form the contiguous planar surface. For example, the various planar fragments that are being aggregated may be assigned common semantic labels indicating that they are part of a contiguous surface, notwithstanding the fact that they occupy different sub-volumes.

Finally, at block 214, data representing the contiguous planar regions can be output. For example, a set of planar points, or a bounding box containing the various planar points for the contiguous planar region may be output to, e.g., a user 106 wearing mixed reality device 104.

Figure 3:
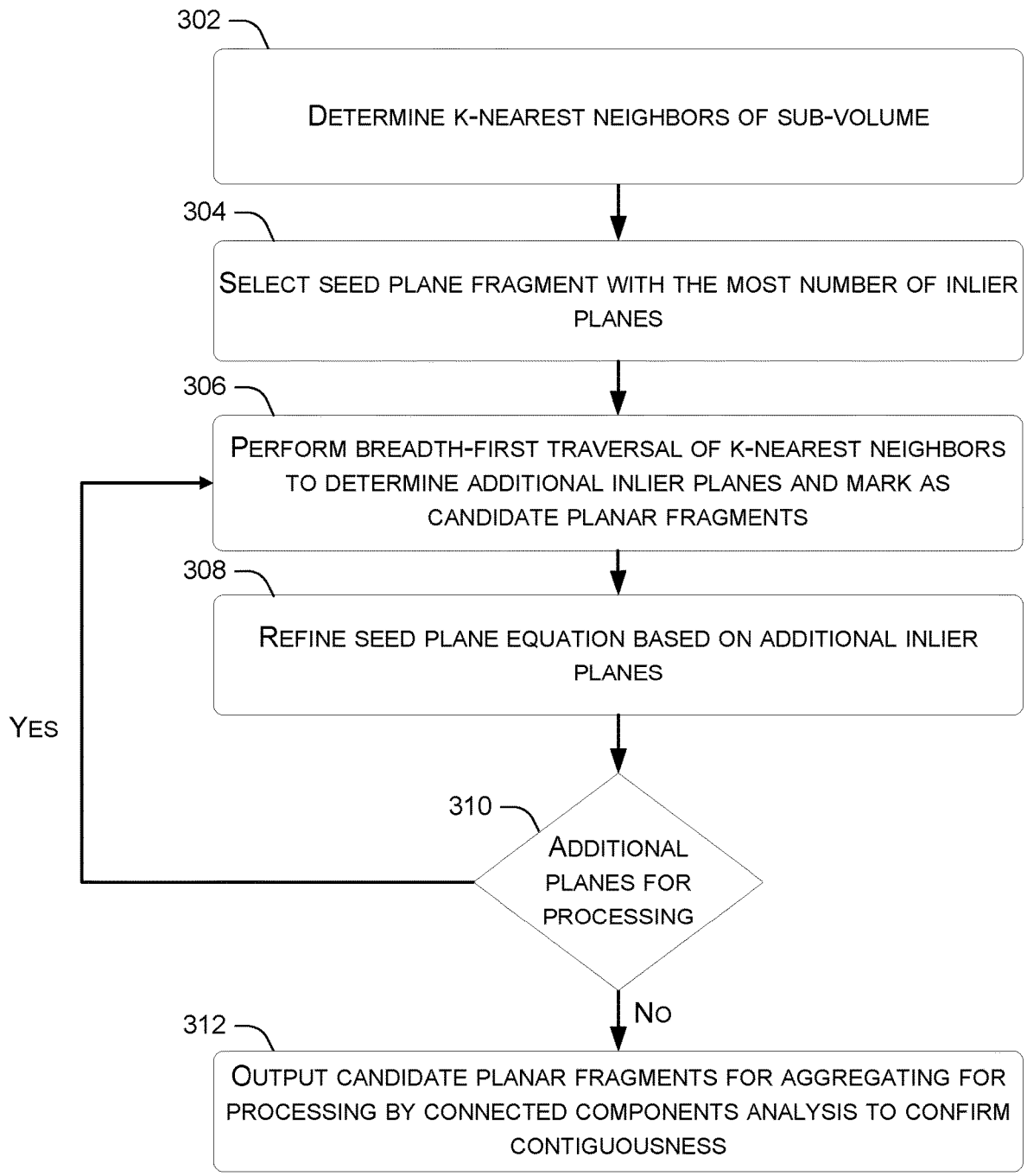

FIG. 3 shows another example method or technique 300, which describes steps performed by the plane aggregation algorithm. First, at block 302, the k-nearest neighbors of a sub-volume can be determined based on the sub-volume position and the positions of neighboring sub-volumes.

Next, at block 304 a listing of planar fragments in the sub-volume and neighboring sub-volumes can be sorted according to the number of inliers to each planar fragment, where the planar fragment with the highest number of inlier planes can be selected as a seed plane. A planar fragment is considered an inlier to the seed plane if the angle between their planar surface normal is below a threshold value, and the distance (along the normal direction) between the two planes' average surface points is below a threshold value.

At block 306, the seed plane can be used as a starting point to initiate a BFT that follows the k-nearest neighbors of the sub-volume to discover additional inlier planes with a similar plane equation to the seed plane within a threshold level of similarity. Similar inliers planes can be marked as candidate planar fragments for aggregation.

Once the BFT propagates through the various neighboring sub-volumes and terminates (i.e., no more planes are found for aggregating), at block 308, the seed plane equation can be recomputed using the entire set of points associated with the inlier planes to create a refined plane equation.

Once the seed plane equation is refined, at block 310, a check can be performed to determine whether there are any additional planes that can be processed based on the refined seed plane equation. If there are additional planes, then a BFT can be initiated again based on the refined plane equation in an attempt to continue growing the planar region, and the process loops back to block 306 to perform additional inlier plane processing. This iterative processing between blocks 306 to 310 continues until there are no more neighboring sub-volumes with additional planar fragments to process.

If there are no additional planes to add based on the refined seed plane equation, then at block 312, the candidate planar fragments marked for aggregation are provided to the connected components analysis to confirm whether the candidate planar fragments should be aggregated into the contiguous planar surface, described in detail above with regard to FIG. 2.

Figure 4:
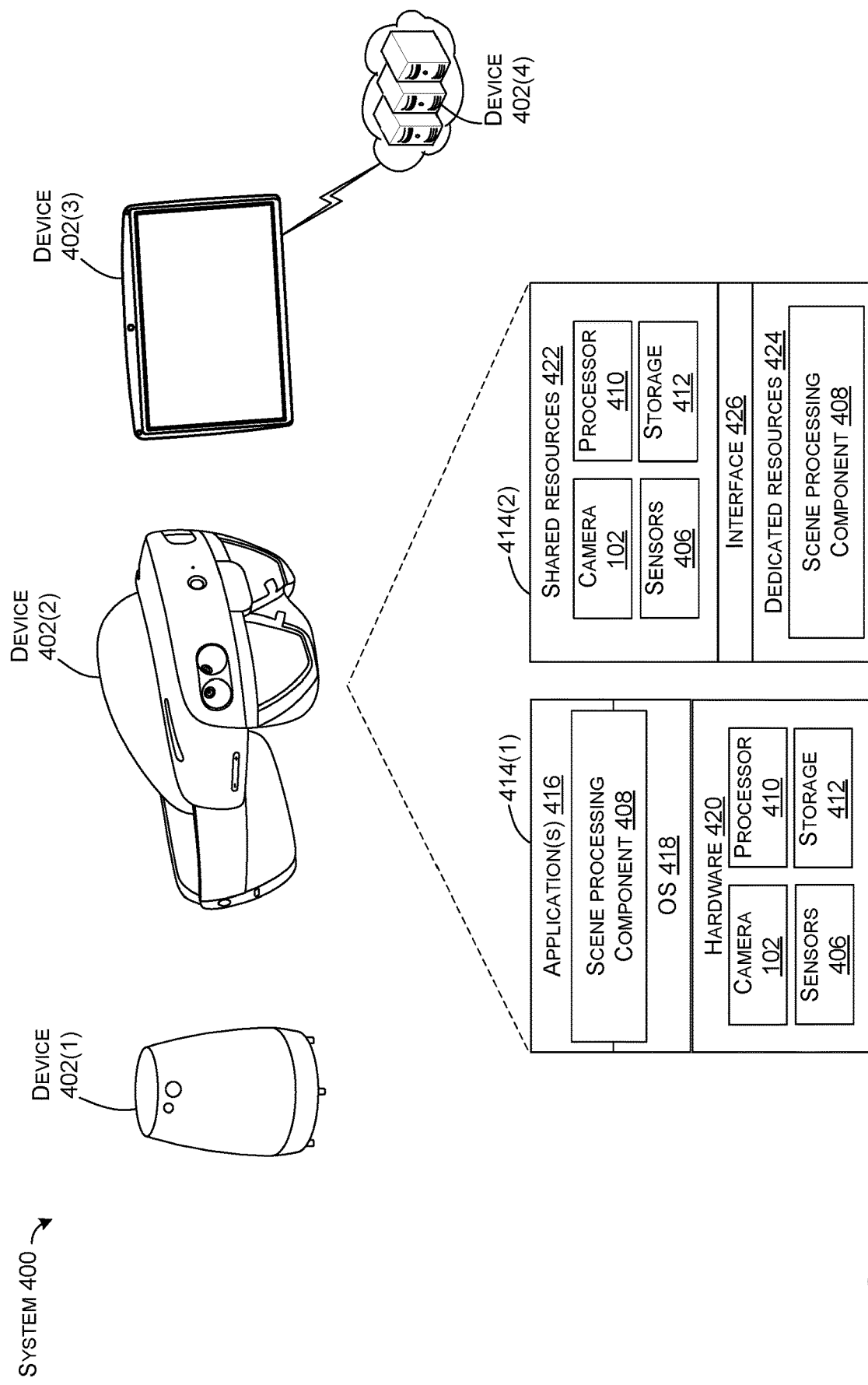
FIG. 4 shows an example system for accomplishing the environmental processing concepts.

FIG. 4 depicts a system 400 that can be used to process surface representations in sub-volumes, and further aggregate planar fragments into contiguous planar surfaces. For purposes of explanation, system 400 can include four devices 402(1), 402(2), 402(3), and 402(4). Device 402(1) is manifest as an autonomous robot that is similar to robot 108 of FIG. 1A. Device 402(2) is manifest as a head mounted mixed reality device, similar to mixed reality device 104 of FIG. 1A, and device 402(3) is manifest as a tablet-type device that can employ a camera. Devices 402(1)-402(3) can include cameras 102. Any of these devices can be freestanding and/or can communicate with other devices, such as server-type devices 402(4). Individual devices 402 can include camera 102, other sensor 406, a scene processing component 408, a processor 410, and/or memory/storage 412.

FIG. 4 depicts two device configurations 414 that can be employed by devices 402. Individual devices 402 can employ either of configurations 414(1) or 414(2), or an alternate configuration. (Due to space constraints on the drawing page, one instance of each device configuration is illustrated rather than illustrating the device configurations relative to each device 402). Briefly, device configuration 414(1) represents an operating system (OS) centric configuration. Device configuration 414(2) represents a system on a chip (SOC) configuration. Device configuration 414(1) is organized into one or more applications 416, operating system 418, and hardware 420. Device configuration 414(2) is organized into shared resources 422, dedicated resources 424, and an interface 426 therebetween.

In some configurations, each of devices 402 can have an instance of the scene processing component 408. However, the functionalities that can be performed by scene processing component 408 may be the same or they may be different from one another. For instance, in some cases, each device's scene processing component 408 can be robust and provide all of the functionality described above and below (e.g., a device-centric implementation). In other cases, some devices can employ a less robust instance of the scene processing component 408 that relies on some functionality to be performed by another device. For instance, device 402(4) may have more processing resources than device 402(1). In such a configuration, some scene processing component functions may be performed on device 402(4) rather than device 402(1), or scene processing may be split among the devices (i.e., some processing locally and some on the cloud) depending on device capability and/or network capability.

In some configurations, devices 402, such as via scene processing component 408, can be configured to perform certain processing in relation to memory 412 storing planar data. Devices 402 may perform processing such as capturing, via camera 102, current environment information, and can further determine whether any sub-volumes need updating due to changes between prior environment information and current environment information by loading from memory/storage 412 a subset portion of the stored planar data associated with the prior environment information. The devices can further be configured to perform additional processing, such as identifying sub-volumes that include changes in planar data between the current environment information and the prior environment information, and can then update the stored planar data associated with the identified sub-volumes.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 402 can include traditional computing devices, such as personal computers, desktop computers, servers, notebook computers, vehicles, smart cameras, surveillance devices/systems, safety devices/systems, wearable smart devices, appliances, and other developing and/or yet to be developed device types, etc.

As mentioned above, device configuration 414(2) can be thought of as a system on a chip (SOC) type design. In such a case, functionality provided by the device can be integrated on a single SOC or multiple coupled SOCs. One or more processors 410 can be configured to coordinate with shared resources 422, such as memory/storage 412, etc., and/or one or more dedicated resources 424, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

ADDITIONAL EXAMPLES

Various device examples are described above. Additional examples are described below. One example includes a method for generating contiguous planar surfaces of a three-dimensional environment, the method comprising partitioning the three-dimensional environment into a plurality of sub-volumes, generating a surface representation in each of the plurality of sub-volumes based on captured environment information, detecting a plurality of planar fragments inside each of the plurality of sub-volumes, aggregating at least some of the plurality of planar fragments, the aggregating forming a detected contiguous planar surface spanning multiple sub-volumes, and outputting data representing the contiguous planar surface formed from the aggregated plurality of planar fragments.

Another example can include any of the above and/or below examples where the generated surface representation utilizes a point cloud or a surface mesh.

Another example can include any of the above and/or below examples where detecting the plurality of planar fragments further comprises determining whether a first planar fragment has a similar plane equation as a second planar fragment, and marking the first planar fragment and the second planar fragment as candidate planar fragments for aggregating based at least on having a similar plane equation.

Another example can include any of the above and/or below examples where the candidate planar fragments are aggregated to form the contiguous planar surface when their plane equations are within a threshold level of similarity.

Another example can include any of the above and/or below examples where the method further comprises capturing subsequent environment information and updating a subset portion of the plurality of sub-volumes corresponding to detected changes reflected in the subsequent environment information.

Another example can include any of the above and/or below examples where each of the plurality of sub-volumes is of a fixed size.

Another example can include any of the above and/or below examples where each of the plurality of sub-volumes is cubical in shape and overlaps with other sub-volumes.

Another example can include any of the above and/or below examples where detecting the plurality of planar fragments is performed independently and in parallel for each sub-volume.

Another example includes a method comprising detecting a plurality of candidate planar fragments for joining that are located within neighboring sub-volumes depicting a physical environment, determining that a first candidate fragment in a first sub-volume and a second candidate planar fragment in a second sub-volume are part of a contiguous planar surface by comparing three-dimensional points associated with the first candidate planar fragment and second candidate planar fragment, and joining the first candidate planar fragment and the second candidate planar fragment to form the contiguous planar surface when the three-dimensional points are within a threshold distance.

Another example can include any of the above and/or below examples where comparing the three-dimensional points further comprises creating a two-dimensional projection image by projecting three-dimensional points from the first candidate planar fragment and the second candidate planar fragment and determining whether the projected three-dimensional points associated with the first candidate planar fragment are within a threshold distance of the projected three-dimensional points associated with the second candidate planar fragment.

Another example can include any of the above and/or below examples where the projection image is created by rasterizing the three-dimensional points.

Another example can include any of the above and/or below examples where the projection image has pixels that are sized according to the threshold distance, and the rasterized three-dimensional points map to the pixels of the projection image.

Another example can include any of the above and/or below examples where the method further comprises checking semantic labels associated with the first candidate planar fragment and the second candidate planar fragment to confirm that the first candidate planar fragment and the second candidate planar fragment should be joined.

Another example can include any of the above and/or below examples where detecting the plurality of candidate planar fragments located within neighboring sub-volumes further comprises determining a set of neighboring sub-volumes based on the positions of the sub-volumes, selecting, as a seed plane, a planar fragment having the highest number of inlier planes, and selecting, as candidate planar fragments, planar fragments of the sub-volumes that have planar equations similar to the seed plane.

Another example can include any of the above and/or below examples where a planar fragment is an inlier plane to the seed plane based at least upon determining that an angle between surface normals is below a threshold value.

Another example can include any of the above and/or below examples where a planar fragment is an inlier plane to the seed plane based at least upon determining that a distance between average surface points is below a threshold value.

Another example includes a system comprising a camera configured to capture environment information of a physical environment, a memory storing planar data associated with a plurality of sub-volumes depicting prior environment information, and a processor configured to capture, via the camera, current environment information, determine whether to update individual sub-volumes due to changes between the prior environment information and the current environment information by loading from the memory a subset portion of the stored planar data associated with the prior environment information and identifying the individual sub-volumes that include changes in planar data between the current environment information and the prior environment information, and updating the stored planar data associated with the identified individual sub-volumes.

Another example can include any of the above and/or below examples where the subset portion is a spherical area of planar data associated with sub-volumes that are within a set distance of a current position of the camera in the physical environment.

Another example can include any of the above and/or below examples where the stored planar data is updated only if the changes in planar data between the current environment information and the prior environment information exceed a threshold number of changes.

Another example includes a method for generating planar surfaces of an environment, the method comprising generating point cloud information based on captured environment information, partitioning the point cloud information into a plurality of sub-volumes, detecting a plurality of planar fragments inside individual sub-volumes, aggregating the plurality of planar fragments that represent a contiguous planar surface that spans multiple sub-volumes, and outputting data representing the contiguous planar surface formed from the aggregated plurality of planar fragments.

CONCLUSION

To summarize some of the aspects described above, some implementations can reduce processing requirements imposed on a mixed reality device by enabling the device to partition a three-dimensional environment into a plurality of sub-volumes. Once the environment is partitioned into sub-volumes, surface representations associated with environment information can be generated in the sub-volumes, and processing can be performed separately on the sub-volumes to detect planar regions that are located within each of the sub-volumes.

Once the planar regions associated with each of the sub-volumes are detected, plane aggregation can be performed, which can attempt to determine whether certain planar regions may be fragments of a contiguous planar region or surface. Once these planar fragments are detected, the plane aggregation algorithm can also determine whether the planar fragments should be aggregated into a contiguous planar surface by checking the planar fragments against a threshold value. If the planar fragments fall within the threshold value, they can be included in the fragments that are aggregated into the contiguous planar surface.

Thus, by generating smaller surface representations in individual sub-volumes, the processing requirements of a device can be reduced/minimized, as only individual sub-volume amounts of plane data are required to be processed at any one point of time.

The order in which the disclosed methods are described is not intended to be construed as a limitation, and any number of the described blocks can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Although techniques, methods, devices, systems, etc., pertaining to scene analysis are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:
1. A method, comprising:
partitioning a three-dimensional environment including objects into a plurality of sub-volumes;
generating a surface representation in each of the plurality of sub-volumes based on captured environment information;
detecting a plurality of planar fragments inside each of the plurality of sub-volumes, the plurality of planar fragments having semantic labels indicating respective objects associated with respective planar fragments;
determining that at least some of the plurality of planar fragments belong to a same object and are candidate planar fragments for aggregating based at least on the semantic labels associated with the candidate planar fragments being the same;

aggregating the candidate planar fragments to form a contiguous planar surface spanning multiple sub-volumes; and
outputting data representing the contiguous planar surface.

2. The method of claim 1, wherein the generated surface representation utilizes a point cloud or a surface mesh.

3. The method of claim 1, wherein determining that at least some of the plurality of planar fragments are candidate planar fragments further comprises:
determining whether a first planar fragment has a similar plane equation as a second planar fragment; and
marking the first planar fragment and the second planar fragment as candidate planar fragments for aggregating based at least on having a similar plane equation.

4. The method of claim 3, wherein the candidate planar fragments are aggregated to form the contiguous planar surface when their plane equations are within a threshold level of similarity.

5. The method of claim 1, further comprising:
capturing subsequent environment information; and
updating a subset portion of the plurality of sub-volumes corresponding to detected changes reflected in the subsequent environment information.

6. The method of claim 1, wherein each of the plurality of sub-volumes is of a fixed size.

7. The method of claim 6, wherein each of the plurality of sub-volumes is cubical in shape and overlaps with other sub-volumes.

8. The method of claim 1, wherein detecting the plurality of planar fragments is performed independently and in parallel for each sub-volume.

9. A method comprising:
detecting a plurality of planar fragments that are located within neighboring sub-volumes depicting a physical environment including objects, the plurality of planar fragments having semantic labels indicating respective objects associated with respective planar fragments;
determining that a first candidate planar fragment in a first sub-volume and a second candidate planar fragment in a second sub-volume belong to a same object and should be aggregated by comparing three-dimensional points associated with the first candidate planar fragment and second candidate planar fragment and by checking that the semantic labels associated with the first candidate planar fragment and the second candidate planar fragment are the same; and
aggregating the first candidate planar fragment and the second candidate planar fragment to form a contiguous planar surface.

10. The method of claim 9, wherein comparing the three-dimensional points further comprises:
creating a two-dimensional projection image by projecting three-dimensional points from the first candidate planar fragment and the second candidate planar fragment; and
determining whether the projected three-dimensional points associated with the first candidate planar fragment are within a threshold distance of the projected three-dimensional points associated with the second candidate planar fragment.

11. The method of claim 10, wherein the projection image is created by rasterizing the three-dimensional points.

12. The method of claim 11, wherein the projection image has pixels that are sized according to the threshold distance, and the rasterized three-dimensional points map to the pixels of the projection image.

13. The method of claim 9, wherein detecting the plurality of planar fragments comprises:
determining a set of neighboring sub-volumes based on positions of the sub-volumes;
selecting, as a seed plane, a planar fragment having the highest number of inlier planes; and
selecting, as candidate planar fragments, planar fragments of the sub-volumes that have planar equations similar to the seed plane.

14. The method of claim 13, wherein a planar fragment is an inlier plane to the seed plane based at least upon determining that an angle between surface normals is below a threshold value.

15. The method of claim 13, wherein a planar fragment is an inlier plane to the seed plane based at least upon determining that a distance between average surface points is below a threshold value.

16. A system comprising:
a camera configured to capture prior environment information of a physical environment;
a memory storing prior planar data associated with a plurality of sub-volumes depicting the prior environment information; and
a processor configured to:
capture, via the camera, current environment information of the physical environment that has changed since the prior environment information was captured; and
determine whether to update individual sub-volumes of the prior environment information stored in the memory based on changes between the prior environment information and the current environment information by:
loading from the memory a subset portion of the prior planar data associated with the prior environment information; and
identifying the individual sub-volumes that include the changes between current planar data associated with the current environment information and the prior planar data associated with the prior environment information; and
updating the prior planar data associated with the identified individual sub-volumes stored in the memory with the current planar data associated with the identified individual sub-volumes to reflect the changes between the current environment information and the prior environment information.

17. The system of claim 16, wherein the subset portion is a spherical area of prior planar data associated with sub-volumes that are within a set distance of a current position of the camera in the physical environment.

18. The system of claim 16, wherein the stored prior planar data is updated with the current planar data only if the changes between the current planar data associated with the current environment information and the prior planar data associated with the prior environment information exceed a threshold.

19. The system of claim 16, wherein the changes include a movement of a captured object in the physical environment.

20. A method, comprising:
generating point cloud information based on captured environment information of an environment including objects;
partitioning the point cloud information into a plurality of sub-volumes;

detecting a plurality of planar fragments inside individual sub-volumes, the plurality of planar fragments having semantic labels indicating respective objects associated with respective planar fragments;

determining a subset of the plurality of planar fragments that belong to a same object and are candidate planar fragments for aggregating based at least on the semantic labels associated with the candidate planar fragments being the same;

aggregating the candidate planar fragments that represent a contiguous planar surface; and outputting data representing the contiguous planar surface.

21. The method of claim 20, wherein the determining is further based at least on colors associated with the candidate planar fragments.

* * * * *